April 3, 1951  R. W. LEWIS  2,547,528
WINDSHIELD VISOR
Filed Oct. 21, 1947  2 Sheets-Sheet 1
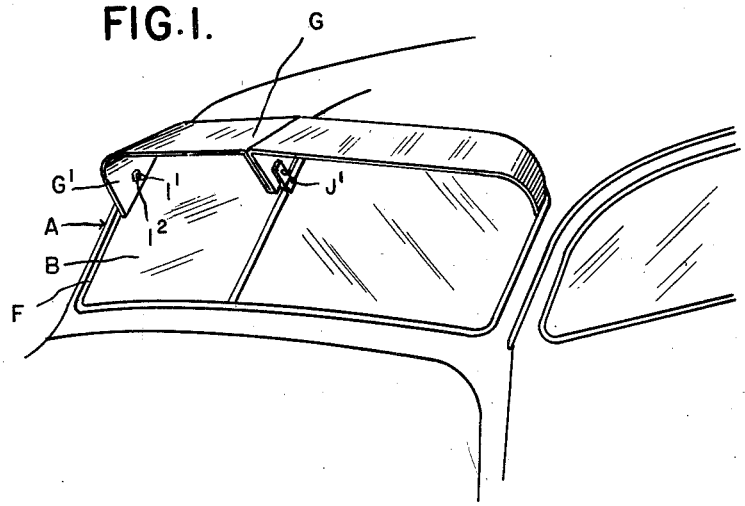
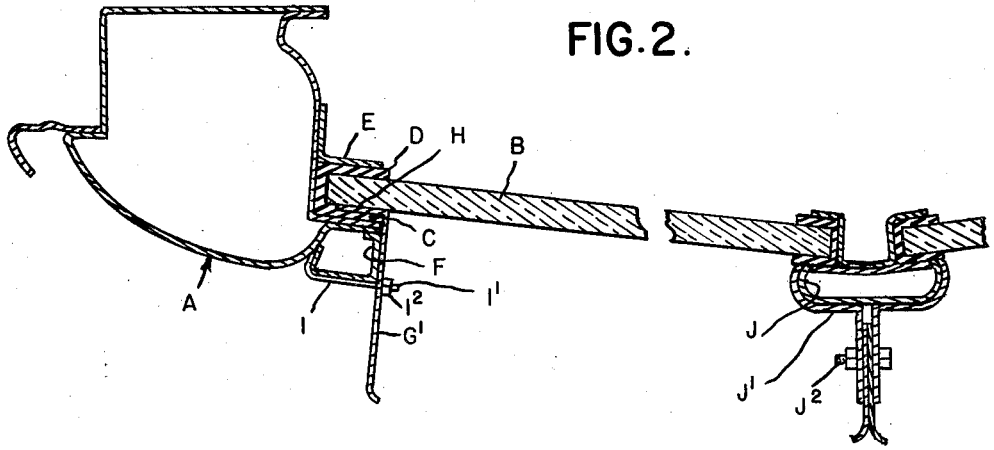
*INVENTOR.*
RICHARD W. LEWIS
BY
ATTORNEYS

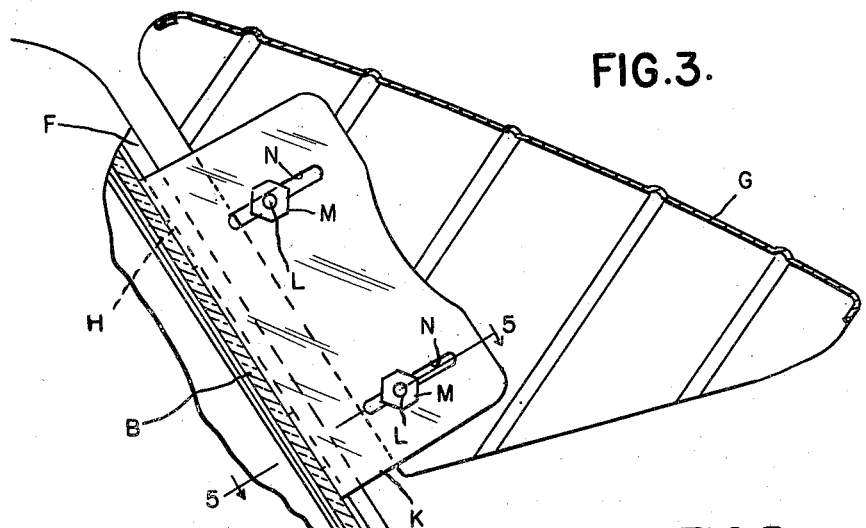
FIG. 3.
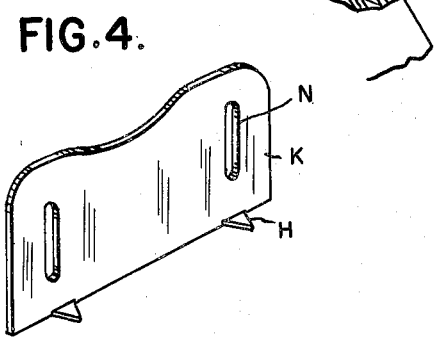
FIG. 4.
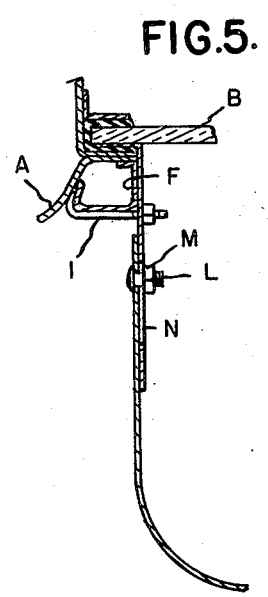
FIG. 5.
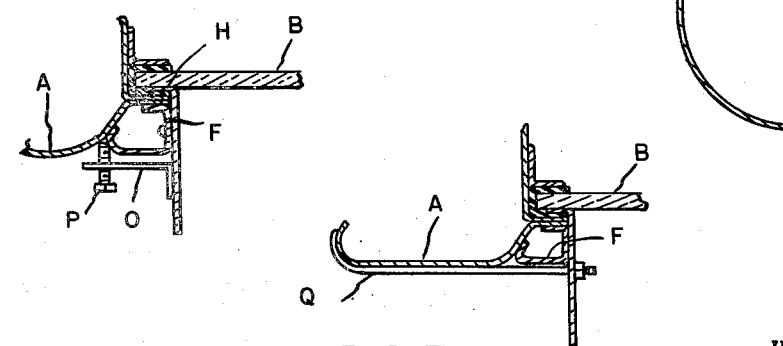
FIG. 6.
FIG. 7.
INVENTOR.
RICHARD W. LEWIS Patented Apr. 3, 1951

2,547,528

UNITED STATES PATENT OFFICE 2,547,528

WINDSHIELD VISOR

Richard W. Lewis, Walled Lake, Mich.

Application October 21, 1947, Serial No. 781,170

2 Claims. (Cl. 296—95)

The invention relates to visors or sunshades for use on vehicles and, more particularly, to that type in which the visor is open at the back so as not to obstruct the free flow of air therethrough. It is the object of the invention to obtain a construction which can be readily attached to any type of car and which forms an effective sunshade and requires for its formation a minimum amount of material. With these and other objects in view the invention consists in the invention as hereinafter set forth.

In the drawings:

Fig. 1 is a perspective view showing the portion of a car with my improved visor secured to the windshield thereof;

Fig. 2 is a horizontal section through a portion of a windshield and the post of the car body to which it is attached, also showing the visor and its means of attachment to the windshield;

Fig. 3 is a vertical section through the windshield and visor showing a modified form of attachment means for the latter;

Fig. 4 is a perspective view of one of the attachment members;

Fig. 5 is a section on line 5—5, Fig. 3; and

Figs. 6 and 7 are views similar to Fig. 5 showing modified constructions.

In the present state of the art, windshield visors are open at the rear so as to avoid interference with the streamlining of the car and the free flow of air therethrough. This precludes the attachment of the rear edge of the visor to the body as was the earlier practice. It is, however, necessary that the visor should be firmly attached to the car body and that it should form an effective sun shield. With my improved construction this is accomplished by forming the attachment between the visor and body at the point where the glass of the windshield is seated. As the visor is only required to cover the transparent portion of the windshield, this construction can be made by the use of a minimum amount of material.

As illustrated in Fig. 2, A is one of the side posts of the vehicle frame between which the windshield extends. B is the glass panel of the windshield having its margin engaging a seat C on the inner side of the post A. A gasket D of rubber, or other suitable resilient material, seals the joint with this seat and suitable securing means such as E holds the parts in position. There is also usually an ornamental border frame F surrounding the glass and concealing the seat for the same, which frame is secured to the body at certain points by suitable means (not shown).

My improved visor G is formed from suitable sheet material such, for instance, as stainless steel and is normally arranged spaced from the glass and at a variable angle for shading from sun without unnecessarily obstructing forward vision through the windshield. At its opposite ends the visor has inturned portions G' which extend into proximity with the glass. In the construction illustrated in Fig. 2, the ends G' come into contact with the outer face of the glass B and are provided with outwardly extending tongues H which are insertable between the glass and the seat C. The parts are held in this position by hooked clamping members I having the hooks thereof engaging the outer portion of the frame F, while the shanks I' extend through holes in the end G' and are threaded to engage the clamping nuts I². Where the glass does not extend completely across the front but only to a central bar or post J of the windshield, I preferably use a pair of visors having their inner ends secured to each other and to said central bar. This is accomplished by a pair of hooked clamps J' embracing the bar J and having their outer portions bolted at J² to the contacting ends of the visors.

With the modified construction shown in Figs. 3 and 4 instead of placing the tongues H directly on the end G', they are upon a separate member K which is parallel with and adjacent to said end. This member K is then clamped by the hook members I as previously described. The visor is adjustably attached to the member K so as to permit of changing its position or angle, preferably by bolts L and nuts M. The bolts pass through slots N in the member K which permit of shifting the same sufficiently for the required adjustment.

With the modified construction shown in Fig. 6 instead of using the clamp I for holding the tongues H in engagement, a bracket arm O is secured to and projects outward from the member K and a set screw P carried by said arm engages the notch or groove between the frame member F and the post A.

In the construction shown in Fig. 7 a hook clamp Q is employed but this extends completely across the front of the post A to the outer edge portion thereof instead of engaging the frame F. With all of these modifications, as well as with others that may be substituted therefor, the visor is secured primarily by the tongues H which latter are held by any suitable means from disengagement.

While I have described my improved visor as applicable to the windshield of an automobile, it is obvious that it might be applied in different locations as, for instance, the rear window of the car. Wherever applied it will be secured in the same manner by the tongues inserted between the glass and its seat and the clamping members for holding the tongues in engagement.

What I claim as my invention is:

1. The combination with a vehicle window having a glass and a seat for a marginal portion thereof and a marginal frame for the glass, of a visor extending across a portion of the glass to the meeting line between the same and said seat, said visor being open front and rear for free flow of air therethrough attachment means for said visor including a tongue secured to the latter to project outward therefrom and sufficiently thin to be inserted between said glass and seat, and a clamp engaging said frame for holding said tongue in its inserted position.

2. The combination with a windshield having a glass and a seat for a marginal portion thereof, of a visor open front and rear for the free flow of air therethrough said visor having an end portion registering with the meeting line of said glass and seat, a marginal frame for said glass and securing means for said visor including a tongue projecting outward therefrom and sufficiently thin to be inserted between said glass and seat, and a clamp engaging said frame for securing said tongue in its inserted position.

RICHARD W. LEWIS.

REFERENCES CITED

The following references are of record in the file of this patent:

UNITED STATES PATENTS

| Number | Name | Date |
|---|---|---|
| 1,644,662 | Anderson | Oct. 11, 1927 |
| 2,173,196 | Bornemann | Sept. 19, 1939 |
| 2,180,909 | Peckat | Nov. 21, 1939 |
| 2,264,014 | Wohlfield | Nov. 25, 1941 |
| 2,318,143 | Cutting | May 4, 1943 |
| 2,334,856 | Atkinson | Nov. 23, 1943 |

FOREIGN PATENTS

| Number | Country | Date |
|---|---|---|
| 405,082 | Great Britain | Feb. 1, 1934 |